(12) United States Patent
Vander Meiden

(10) Patent No.: US 6,553,116 B1
(45) Date of Patent: Apr. 22, 2003

(54) SYSTEM AND METHOD FOR EARLY DETECTION OF AREA CODE CHANGES

(75) Inventor: David Alan Vander Meiden, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/389,258

(22) Filed: Sep. 3, 1999

(51) Int. Cl.[7] .................................................. H04M 3/00
(52) U.S. Cl. ......................... 379/355.08; 379/355.05; 379/355.06; 379/355.07
(58) Field of Search .................... 379/93.01, 142.06, 379/355.04, 355.07, 355.08, 219, 220.01, 355.05, 355.06, 216.01

(56) References Cited

U.S. PATENT DOCUMENTS

| | | | |
|---|---|---|---|
| 4,447,676 A | 5/1984 | Harris et al. | 179/90 BD |
| 4,833,702 A | 5/1989 | Shitara et al. | 379/60 |
| 5,259,026 A | 11/1993 | Johnson | 379/207 |
| 5,455,858 A | 10/1995 | Lin | 379/355 |
| 5,528,680 A * | 6/1996 | Karpicke | 379/355.08 |
| 5,594,945 A | 1/1997 | Lewis et al. | 455/38.1 |
| 5,623,541 A | 4/1997 | Boyle et al. | 379/136 |
| 5,644,625 A * | 7/1997 | Solot | 379/88.22 |
| 5,754,636 A | 5/1998 | Bayless et al. | 379/142 |
| 5,764,639 A | 6/1998 | Staples et al. | 370/401 |
| 6,044,066 A * | 3/2000 | Glass, III | 370/252 |
| 6,047,062 A * | 4/2000 | Bijman | 379/355.06 |
| 6,195,417 B1 * | 2/2001 | Dans | 379/67.1 |
| 6,269,122 B1 * | 7/2001 | Prasad et al. | 375/240.28 |
| 6,289,095 B1 * | 9/2001 | Buttitta et al. | 379/220.01 |
| 6,330,327 B1 * | 12/2001 | Lee et al. | 379/266.1 |
| 6,345,095 B1 * | 2/2002 | Yamartino | 379/355.08 |
| 6,351,636 B2 * | 2/2002 | Shaffer et al. | 455/414 |

FOREIGN PATENT DOCUMENTS

JP        402228863 A  *  3/1989  ............ 379/280

OTHER PUBLICATIONS

Commonly assigned U.S. patent application Ser. No. 08/960,404; filed Oct. 29, 1997.

* cited by examiner

Primary Examiner—Ahmad F. Matar
Assistant Examiner—Bing Bui

(57) ABSTRACT

A telecommunications device able to automatically detect a pending change in an area code or numbering plan area (NPA) during the period when either the new area code or the existing area code may be used to dial a particular number. Such a telecommunications device is configured to read an ISDN connected party number or an H.323 connected party number during the permissive period and compare the connected party number with the called party number. If there is a mismatch of the area code and the numbers otherwise match, the telecommunications device knows that an area code update is pending and advises the user thereof accordingly. Alternatively, the telecommunications device may itself automatically update speed dialing lists, routing tables, and the like.

3 Claims, 7 Drawing Sheets

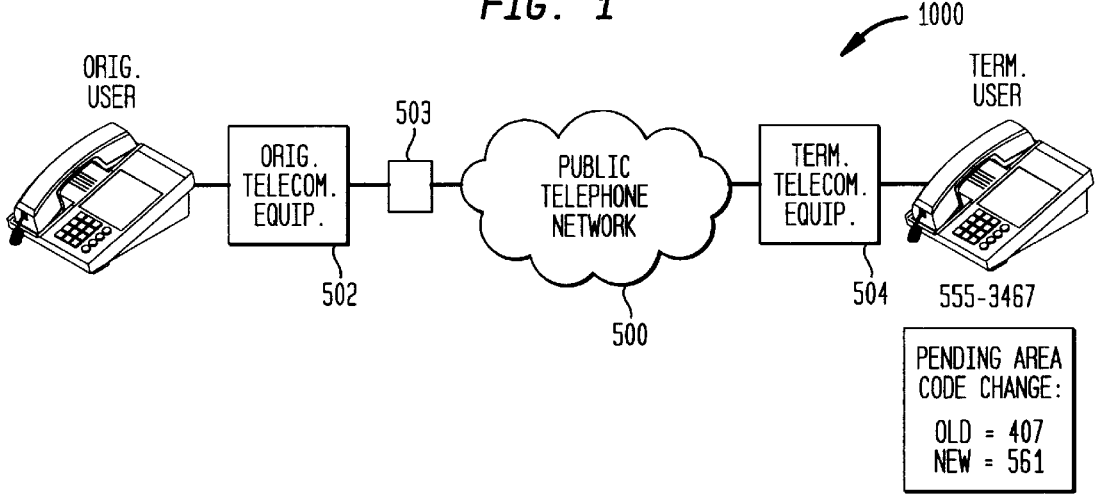
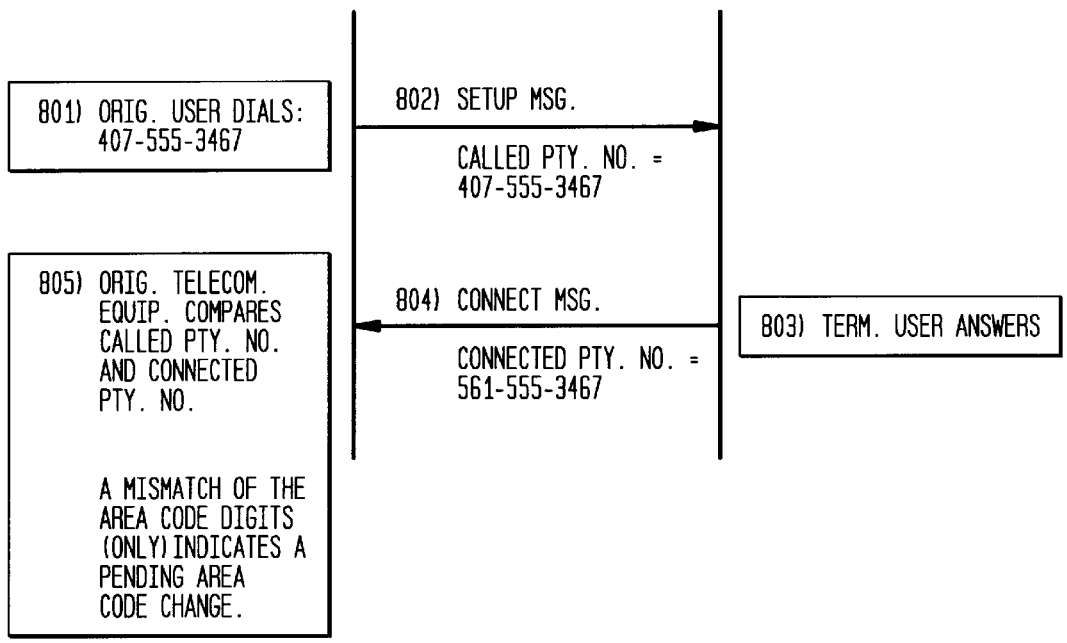

SYSTEM AND METHOD FOR EARLY DETECTION OF AREA CODE CHANGES

BACKGROUND OF THE INVENTION

Field of the Invention

The present invention relates to telecommunications systems, and in particular, to a system and method for automatically detecting pending area code changes and updating speed dialing lists, routing tables, and the like.

DESCRIPTION OF THE RELATED ART

The proliferation of various telecommunications devices such FAX machines, modems, pagers and cellular phones has resulted in an extensive restructuring of the North American Numbering Plan (NANP) area code boundaries, including the splitting of existing area codes into one or more new area codes. Such area code changes typically occur in four phases. During a first phase, when the directory number is unique, no notification by telephone is given to the call originator that the area code of the dialed number is changing. The call is simply completed. In the second phase, when the directory number is still unique, the originator may be advised by the Central Office that the number being called is changing to a new area code. In the third transitional phase, the Central Office notifies the caller that the area code has changed, but leaves it to the caller to redial the number with the proper updated area code and directory number. Finally, in the fourth phase, the area code update is complete and the Central Office notifies the caller that the area code for the number has been changed, provides the new area code, notifies the caller that the number is not in service, or possibly connects the caller to a wrong number if the number has been reassigned.

Unfortunately, each change in area code or telephone number presently requires manually updating telecommunications systems. In particular, additions or changes to telephone area codes requires individual reprogramming of several types of equipment, including private branch exchanges (PBX), call accounting systems, voice mail systems, speed dial lists in facsimile (FAX) machines, network management systems, dial up routers, communications software and integrated services digital network (ISDN) devices and terminal adapters (TA), Telephony over LAN (ToL) gateways, gatekeepers, and other devices, hereinafter telecommunications devices. If these telecommunications devices are not reprogrammed, access to telephone lines in the regions undergoing area code changes becomes inconvenient, if not impossible. Generally, a service technician or an onsite communications manager manually updates the system with the new area codes as needed.

Therefore, there is a need for an updating system wherein telecommunications networks and devices may automatically detect an area code change and be reprogrammed with new area code information without the need for manual intervention.

SUMMARY OF THE INVENTION

These and other problems in the prior art are overcome in large part by a system and method according to the present invention. A telecommunications device according to the present invention is able to automatically detect a pending change in an area code or numbering plan area (NPA) during the period when either the new area code or the existing area code may be used to dial a particular number. Such a telecommunications device is configured to read a connected party number during the permissive period and compare the connected party number with the called party number. If there is a mismatch in the area code portion of the number and the numbers otherwise match, the telecommunications device knows that an area code update is pending and advises the user thereof accordingly. Alternatively, the telecommunications device may itself automatically update speed dialing lists, routing tables, and the like. According to a first embodiment, the call setup and call connect messages are ISDN (Q.931) call setup and call connect messages. According to a second embodiment, the call setup and call connect messages are ToL H.323 compliant call setup and call connect messages.

BRIEF DESCRIPTION OF THE DRAWINGS

A better understanding of the invention is obtained when the following detailed description is considered in conjunction with the following drawings in which:

FIG. 1 is a diagram of an exemplary telecommunications network according to an embodiment of the present invention;

FIG. 4 is a diagram illustrating signal flow for an embodiment of the invention;

DETAILED DESCRIPTION OF THE INVENTION

Figure 2:
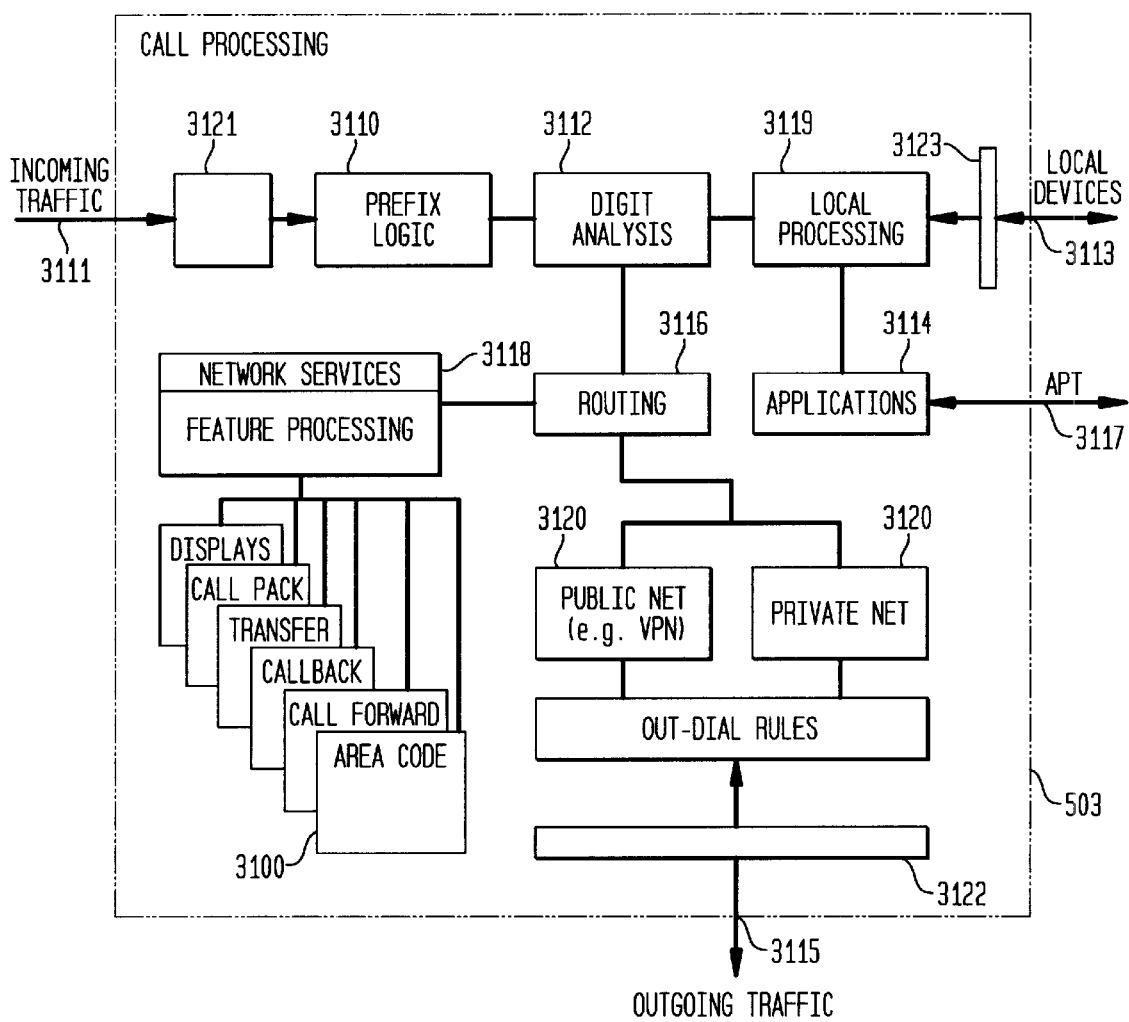
FIG. 2 is a diagram of an exemplary telecommunications server according to an embodiment of the invention.

Turning now to the drawings and, with particular attention to FIG. 1, a diagram illustrating a telecommunications network according to an embodiment of the invention is shown and identified by the reference numeral 1000. As will be discussed in greater detail below, the telecommunications network is subject to changes in numbering plan areas (NPAs). Telecommunications devices coupled within the telecommunications network 1000 are able to identify a new area code based on a comparison of sent called party information and received connected party information.

Thus, the telecommunications network includes originating telecommunications equipment 502 and terminating telecommunications and equipment 504. The originating telecommunications equipment 502 and terminating telecommunications equipment 504 may be embodied as digital or analog telephones or other known telecommunications equipment. The originating telecommunications equipment 502 and the terminating telecommunications equipment 504 are operably coupled to one another via the public telephone network 500. The public telephone network 500 may be embodied as a combination of linked analog and digital networks, as is known. For example, the public telephone network may be configured to as an integrated services digital network (ISDN). Thus, according to one embodiment, the originating telecommunications equipment 502 and the terminating telecommunications equipment 504 may be implemented as ISDN TE1 devices with standard ISDN chipsets, such as the PEB2070 available from Siemens Corp. The originating telecommunications device 502 and the terminating telecommunications device 504 may interface to the public telephone network 500 via ISDN NT1 devices (not shown), which are used to terminate a U-loop from a public telephone network Central Office. In turn, the NT1 device connects to the TE1 devices via an S/T bus. In addition, an ISDN NT2 device, such as a private branch exchange or telecommunications server 503, may be used to provide the interface between the NT1 device and the TE1 devices. As will be discussed in greater detail below, the originating telecommunications equipment 502 and the terminating telecommunications equipment 504 may be situated at different locations and, particularly, within areas having different area codes, or having area codes which are about to change. The devices 502, 504, and the server 503, may be configured according to the present invention to update their area code lists in response to a comparison of called party numbers and connected party numbers sent via call setup and received via call connect messages.

A block diagram of an exemplary server 503 according to an embodiment of the invention is shown in FIG. 2. The server 503 includes a network resource feature processing module 3118 which may be used to handle area code updating according to the present invention. The feature processing module 3118 may also be used to handle other supplementary services, such as area code updating unit 3100 according to an embodiment of the present invention. The communications server 503 may be any known telecommunications server and include internal standard components such as prefix logic 3110 and digit analysis 3112 for receiving, decoding and evaluating number information, applications logic 3114 such as CTI, a local processing unit 3119 for providing user interface aspects of various supplementary services, and a routing unit 3116 for routing a call to its proper destination. External interfaces to the server may include an incoming trunk 3111, such as a primary rate interface (PRI) or Internet line, incoming local traffic 3113, such as a basic rate interface (BRI) and outgoing traffic 3115, such as interfaces for PRI, virtual public (VPN) and private networks, and the like. An API 3117 may be used to connect CTI devices (e.g., using TAPI) to the server 503. The outgoing traffic may be routed, among other methods, over ISDN, asynchronous transfer mode or Intra/Internet communication networks.

The incoming/outgoing traffic lines, such as the BRI 3113 and PRI 3111, interface to device/trunk handlers 3121–3123. The trunk handlers 3121–3123 interface the server 503 to the external interface 3111, 3113, 3115 which contain the signaling channels. In particular, the handlers 3121–3123 operate as translation devices.

As will be discussed in greater detail below, a server such as the server 503 which is handling the call setup and connect operations for a telecommunications device 502 may also include area code updating based on a comparison of the numbers sent in the call setup and received in the call connect messages, for example, using the area code updating unit 3100.

Figure 3:
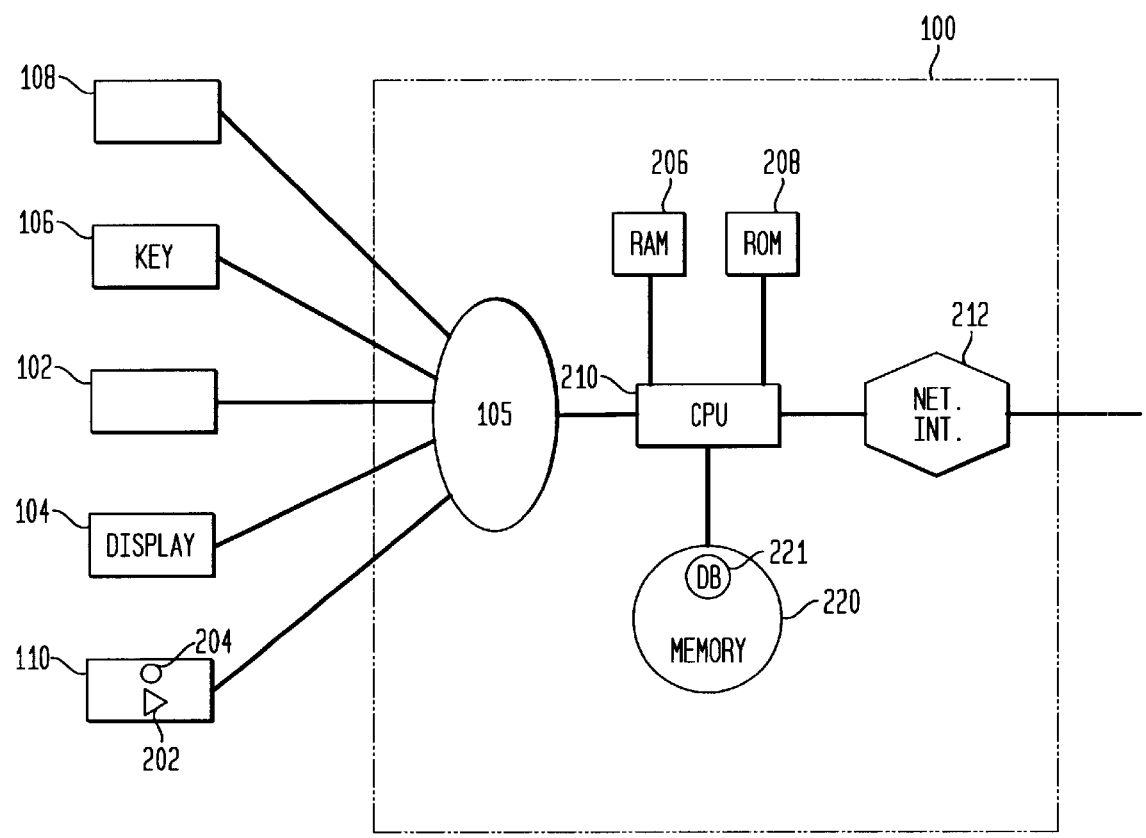
FIG. 3 is a block diagram of an exemplary telecommunications device according to an embodiment of the present invention.

A block diagram of a telecommunications device 502, 504 is shown in FIG. 3. The telecommunications device 502 includes a central processing unit (CPU) 210 which is the primary controller for the telecommunications device 502. The CPU 210 may be embodied as a known microprocessor or microcontroller. The CPU 210 is coupled to random access memory (RAM) 206, read only memory (ROM) 208, and a mass storage device 220. As is know, the CPU 210 is configured to run programs stored in one or more of the RAM 208, ROM 206, or mass storage device 220. The CPU 210 is coupled to a network interface 212. The network interface is configured to interface the telephony device 502 to the public network. For example, the network interface 212 may be embodied as an ISDN network interface or terminal adapter. Thus, the telecommunications device 502 is compliant with the International Telecommunications Union Standard Q.930/931, which is hereby incorporated by reference in its entirety as if fully set forth herein. The CPU 210 is further coupled to an I/O interface 105, which provides an interface to the keypad 106, the warning lights 108, the display 104, and the handset 110, including the speaker 202 and microphone 204. As will be discussed in greater detail below, the telecommunications device 502 is configured to store in the memory device 220 a database 221 of called party numbers and associated area codes.

The telecommunications device 502 is configured to call the terminating telecommunications device 504, using its known area code and telephone number. As is known, the originating telecommunication device provides this information onto the network 500 in order to complete the call. Also, as known, the terminating telecommunications equipment 504 receives the call setup message and responds with a call connect message. The call connect message includes the terminating equipment's telephone number, including the new area code, if any. The originating telecommunications equipment then accesses its database to determine whether the received area code matches the area code stored in the database. If not, a pending area code change is indicated.

This is illustrated more clearly with reference to the signaling diagram of FIG. 4. As shown in FIG. 4, an originating party user dials a terminating party user's telephone number, in a step 801. The originating telecommunications device 502 issues a call setup message to the public telephone network 500, in a step 802, which includes the called party's telephone number. As is known, the call setup message may be received by one or more switches, such as Central Offices or Private Branch Exchanges or the server 503, which use the called party's number, as well as calling party identification information (not shown) to direct the call. The switch 503 then provides the call setup signal to the public network 500. The public network 500 directs the call to the terminating party, which answers, in a step 803. In particular, the terminating party device 504 issues a call connect message, in a step 804. As is known, the call connect message includes the terminating party's telephone number and, particularly, the new area code. In response, in a step 805, the originating equipment 502 receives the call connect message, typically via the switch or server 503 and uses the received telephone number to determine whether an area code change is pending. The server 503 may also use a comparison of the call setup and connect messages to update its own area code lists, for example, using its own area code unit 3100.

Figure 5:
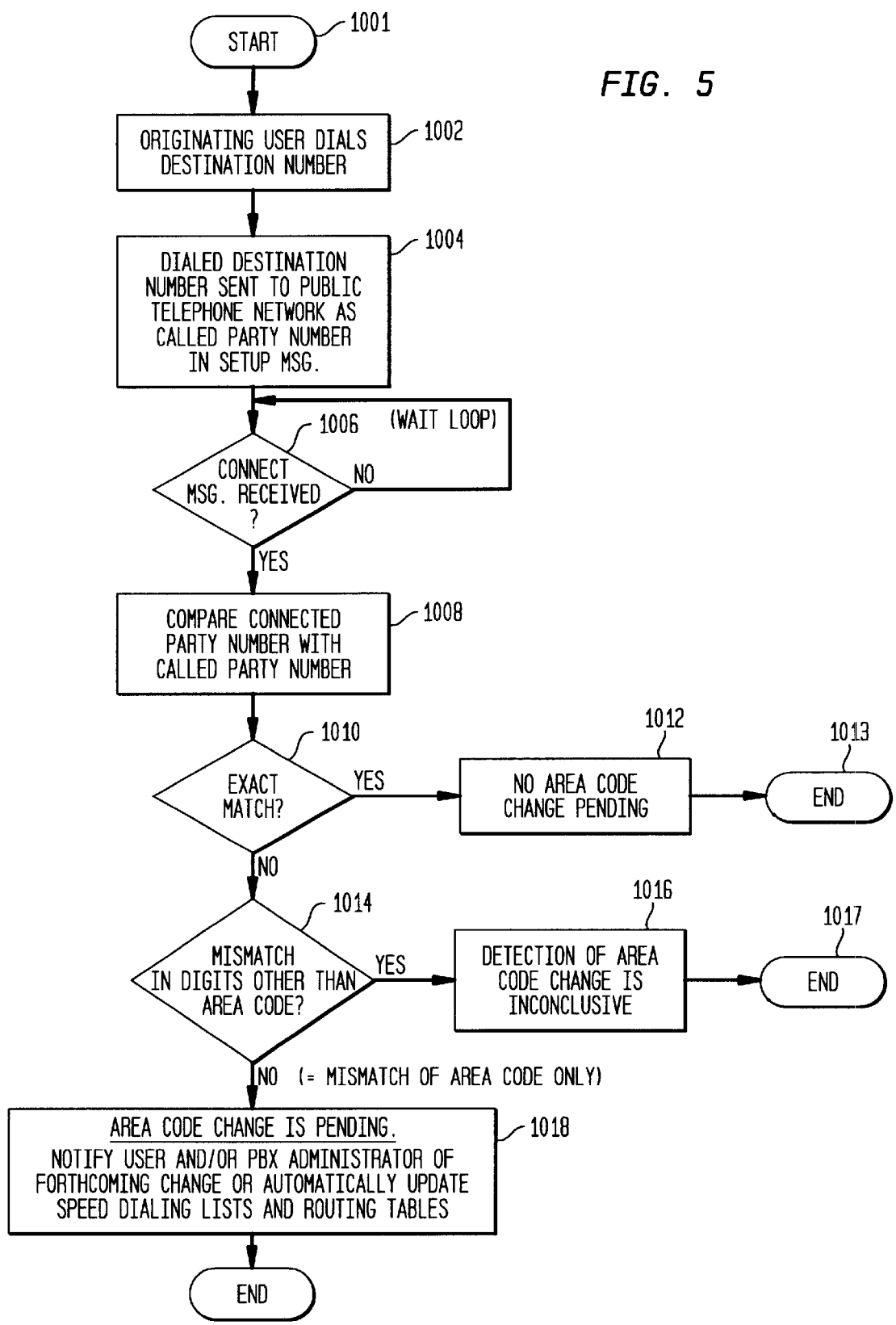
FIG. 5 is a flowchart illustrating operation of an embodiment of the invention.

Area code updating by a telephony device is illustrated more clearly with reference to the flowchart of FIG. 5. In particular, in a step 1001, the originating user may begin the process, for example, by taking the telephone off hook. In a step 1002, the originating user dials the destination number, i.e., the number of the terminating telecommunications equipment 504. Thus, for example, the user inputs a series of digits into the keypad which are received as one or more DTMF tones. In a step 1004, the dialed destination number is sent to the public telephone network 500 as a called party number in the ISDN call setup message. For example, the resulting DTMF tones may be provided to the network interface 212 which translates the tones into ISDN signals and which generates an ISDN call setup message including the called party number. In addition, the CPU 20 may store the called party number in the memory 220, or in RAM 206. As is known, the call setup message may be received and processed by one or more switching devices, such as private branch exchanges or central offices or, particularly, the server 503. The call setup message is typically provided to the server 503 and then onto the network. In a step 1006, the originating party telecommunications device 502 and, particularly, the CPU 210, enters a wait mode, awaiting the reception of the call connect message from the terminating party telecommunications device 504, typically via the server 503. If the call connect message is received, then in a step 1008, the CPU 212 extracts the called or terminating party's telephone number from the received call connect message and compares this connected party number with the called party number. More particularly, the CPU 212 stores the connected party number in the RAM 206 and compares it to the called party number already stored. If there is an exact match, then the CPU 210 decides that no area code change is pending, in a step 1012, and the process ends, in step 1013.

If in step 1010, no exact match was found, then in a step 1014, the CPU 210 determines whether a mismatch occurred in digits other than the area code. If so, then detection of an area code change is determined to be inconclusive, in a step 1016, and the process ends, in a step 1017. In this case, no automatic updating should occur.

If in step 1014, the mismatch was found to have occurred only with respect to the area code, then in a step 1018, the CPU 210 takes affirmative action in response. For example, in one embodiment, the CPU 210 may automatically update speed dialer lists and routing tables, for example, by accessing the memory device 220. Alternatively, the CPU 210 may merely issue a warning or other message to the user and/or the PBX administrator indicating that an area code update is pending.

It is noted that, while described above generally with respect to a device 502, the server 503 may similarly, using its area code update unit 3100, receive the called and connected party numbers, perform a comparison and update the area code in routing tables accordingly.

Figure 6:
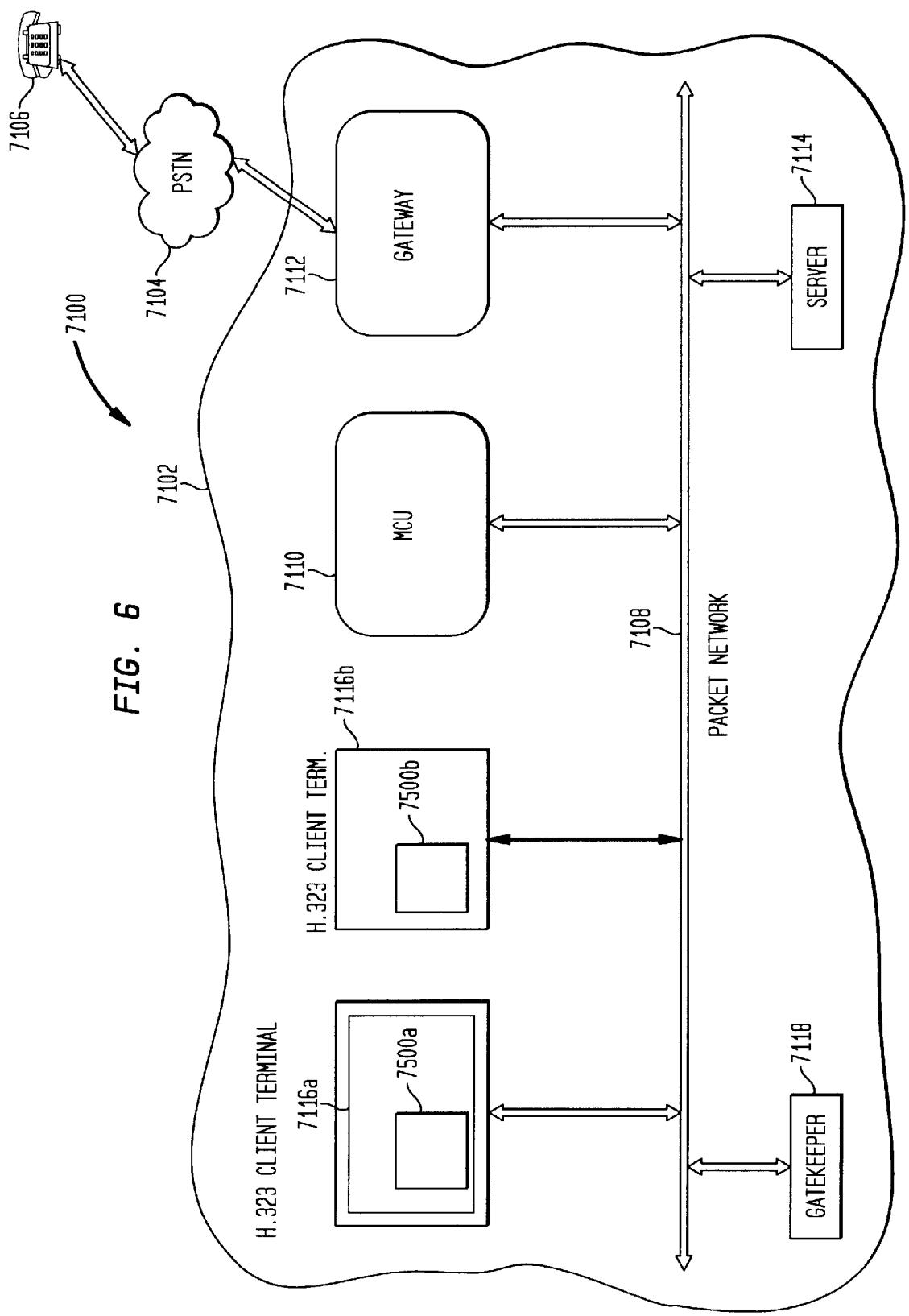
FIG. 6 is a diagram of another telecommunications system according to an embodiment of the invention.

As noted above, the present invention also may be embodied as an H.323 Recommendation compliant device. A telecommunications system employing an H.323 compliant device according to the present invention is shown in FIG. 6. The telecommunications system 7100 includes an H.323 network 7102 coupled to the public telephone network 7104 to other telephones 7106.

The H.323 telecommunications system 7102 includes a local area network (LAN) or packet network 7108. Coupled to the LAN 7108 may be a variety of H.323 terminals 7116a, 7116b, a multi-point control unit (MCU) 7110, an H.323 gateway 7112, an H.323 gatekeeper 7118, a LAN server 7114 and a plurality of other devices such as personal computers (not shown). The H.323 gateway 7112 provides an interface to the public telephone network 7104. Thus, the H.323 gateway 7112 converts signals from H.323 compliant format into signals compatible with the public telephone network. The gatekeeper 7118 may be used for call routing and bandwidth management.

The H.323 terminals 7116a, 7116b are in compliance with the H.323 Recommendation. Thus, the H.323 terminals 7116a, 7116b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 7116a, 7116b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 7116a, 7116b include area code update units 7500a, 7500b according to the present invention. As will be described in greater detail below, the area code update units 7500a, 7500b receive Call Connect messages from the gateway 7112, informing the H.323 terminal that a call has been connected. The area code update units 7500a, 7500b then compare the received connected party number with the called party number. If the area code of the numbers do not match and the numbers otherwise match, the area code may be updated.

Figure 7:
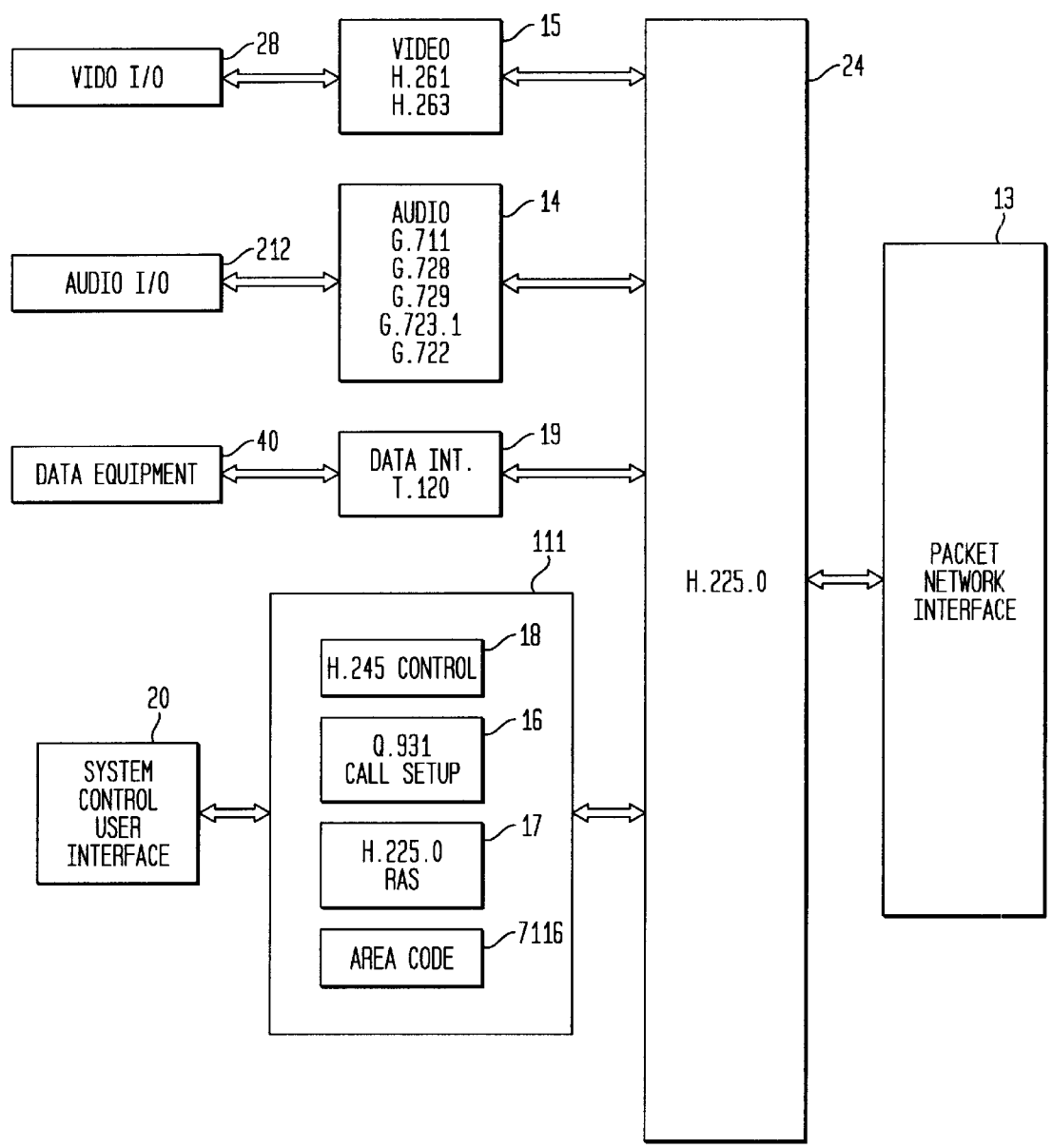
FIG. 7 is a block diagram of an exemplary telecommunications device according to an embodiment of the invention.

In accordance with a specific embodiment, FIG. 7 illustrates a logical diagram of an H.323 interface to the LAN 7108 according to an embodiment of the invention. The interface includes a network terminal/device 7116 having a packet network interface 13 that is coupled to the network terminal 7116. As will be discussed in greater detail below, the network terminal 7116 utilizes the ITU-T H.323 Recommendation protocol. The network interface 13 couples the network terminal 7116 to the LAN 7108. H.323 terminals/devices and equipment carry real-time voice, video and/or data. It should be noted that H.323 is an umbrella recommendation that provides recommendations for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The H.323 terminal 7116 is coupled to a video input/output (I/O) interface 28, an audio I/O interface 212, a data equipment interface 40, and a system control user interface (SCUI) 20. The network terminal 102 further includes an H.225.0 layer 24, an audio coder/decoder (codec) 14 and may include, a video codec 15, and a T.120 data interface layer 19. The audio I/O interface or card 212, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes the received signals.

The video I/O interface or card 28, which may be part of the standard H.323 device, connects to a video codec 15, such as an H.261 codec for encoding and decoding video signals. The video codec 15 encodes video signals for transmission and decodes the received signals. H.261 is the mandatory codec for H.323 terminals that support video, though other codecs such as H.263 may be supported. The system control user interface (SCUI) 20 provides signaling and flow control for proper operation of the H.323 terminal 102. In particular, call signaling and control are handled by the SCUI 20.

A control unit 111 according to the present invention is coupled to the SCUI 20. The control unit 111 includes a control layer 11 which includes a Q.931 layer 16, an H.225.0 RAS layer 17, and an H.245 layer 18. The SCUI 20 interfaces to the H.245 layer 18 which is the media control protocol that allows capability exchange, opening and closing of logical channels, mode preference requests, flow control messages, and other miscellaneous commands and indications. The SCUI 20 also interfaces to the Q.931 protocol which defines the setup, teardown, and control of H.323 communication sessions. The SCUI 20 further interfaces to the H.225.0 Registration, Admission and Status (RAS) protocol 17 that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from the Q.931 layer 16a, 16b, is the protocol for establishing a connection among two or more terminals and also formats the transmitted video, audio, data, signaling, and control streams into messages for communication via the network interface 13 (e.g., packet network 101). The H.225.0 layer 24 also retrieves the received video, audio, data, signaling and control streams from messages that have been input from the network interface, routes the signaling and control information and routes media streams to the appropriate audio, video and data interfaces. The device may also implement supplementary services according to the H.450.X Recommendations.

Figure 8:
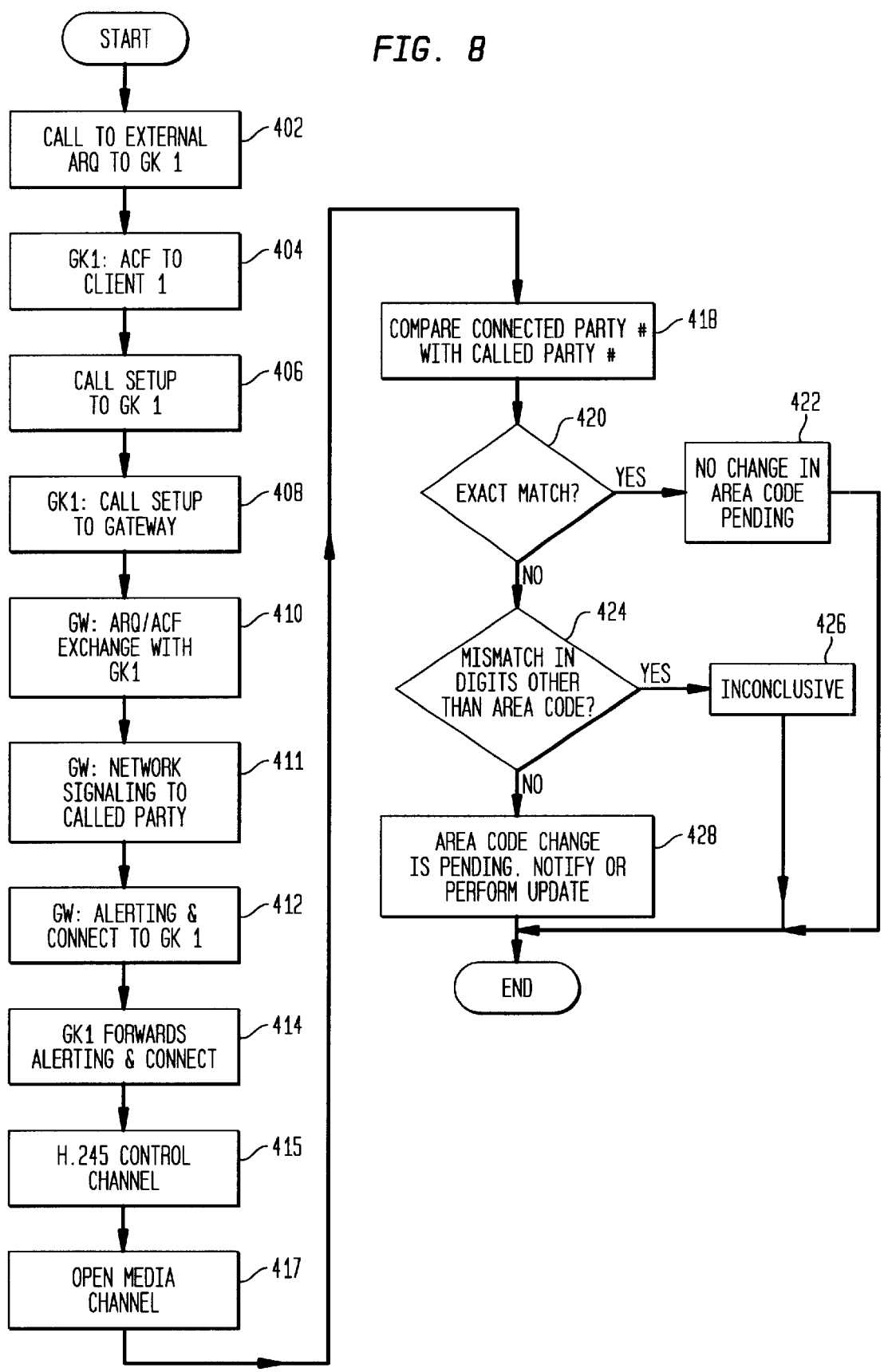
FIG. 8 is a flowchart illustrating operation of an embodiment of the invention.

Operation of this embodiment of the invention is illustrated more clearly with reference to the flowchart of FIG. 8. In particular, in a step 402, the endpoint Client 1 wants to establish a call to another party at another location in a different numbering plan area. The endpoint Client 1 and, particularly, the state machine or control unit 110a, sends an ARQ message (AdmissionRequest) to the gatekeeper GK 1. Assuming the gatekeeper GK 1 is functioning, the gatekeeper GK 1 responds with an ACF (AdmissionConfirm) message to Client 1, in a step 404, which is received by the state machine 110a. The ACF message includes a Call Signaling Transport Channel Address of the gatekeeper GK 1. In a step 406, in response to the ACF message, the state machine 110a sends an H.*225.0* set-up message to the gatekeeper GK 1, including a Globally Unique Call Identifier to identify the call. In a step 408, the gatekeeper GK 1 relays the H.225.0 set-up message to the endpoint gateway 7112. In response, in a step 410, the gateway 7112 conducts an ARQ/ACF exchange with the gatekeeper GK 1. In addition, the gateway 7112 undertakes the necessary control signaling for communication on the public telephone network, in a step 411. In a step 412, the gateway 7112 sends H.225.0 Alerting and Connect messages to the gatekeeper GK 1 as the call progresses to the connect state. The gatekeeper GK 1, in turn provides the Alerting and Connect messages to the endpoint Client l's state machine 110a in a step 414. The Alerting or Connect message includes the called party's telephone number, which is used, in a step 415, to establish the H.245 control channel. In a step 417, the media channel is opened between endpoint Client 1 and the gateway 7112 which has connected or opened a channel on the public telephone network tot he called party.

Once the call connect message is received, then in a step 418, the area code update unit extracts the called or terminating party's telephone number from the received call connect message and compares this connected party number with the called party number. If there is an exact match as determined in a step 420, then the area code update unit decides that no area code change is pending, in a step 422, and the process ends.

If in step 420, no exact match was found, then in a step 424, the area code update unit determines whether a mismatch occurred in digits other than the area code. If so, then detection of an area code change is determined to be inconclusive, in a step 426, and the process ends. In this case, no automatic updating should occur.

If in step 424, the mismatch was found to have occurred only with respect to the area code, then in a step 428, the area code update unit takes affirmative action in response. For example, in one embodiment, the area code update unit may automatically update speed dialer lists and routing tables. Alternatively, the area code update unit may merely issue a warning or other message to the user and/or the network administrator indicating that an area code update is pending.

What is claimed is:

1. A telecommunications device, comprising:

signaling means for receiving call connect commands responsive to call setup commands, said call connect commands including a connected party phone number;

means operably coupled to said receiving means for comparing said connected party phone number to a corresponding called party phone number; and means for updating an area code of said called party phone number if said called party phone number and said connected party phone number do not match;

said comparing means including means for comparing an area code of said connected party number and an area code of said called party number;

said updating means including means for updating said area code if said area code of said connected party number and said called party number do not match, but said called party number and said connected party number otherwise match;

said signaling means including means for sending H.323 call setup commands and receiving H.323 call connect commands.

2. A method for operating a telecommunications system, comprising:

receiving call connect commands responsive to call setup commands, said call connect commands including a connected party phone number;

comparing said connected party phone number to a corresponding called party phone number;

updating an area code of said called party phone number if said called party phone number and said connected party phone number do not match; and sending H.323 call setup commands;

said receiving includes H.323 call connect commands;

said comparing including comparing an area code of said connected party number and an area code of said called party number;

said updating including updating said area code if said area code of said connected party number and said called party number do not match, but said called party number and said connected party number otherwise match.

3. A telecommunications system, comprising:

a first telephony device configured to transmit call setup commands when making a call to a called party number and receive call connect commands responsive to said call setup commands, said call connect commands identifying a connected party number;

a second telephony device configured to receive said call setup commands and transmit said call connect commands;

wherein said first telephony device is configured to compare said called party number and said connected party number and update an area code of said called party number if said called party number and said connected party number do not match;

wherein said first and second telephony devices are H.323 compliant.

* * * * *